Patented June 12, 1923.

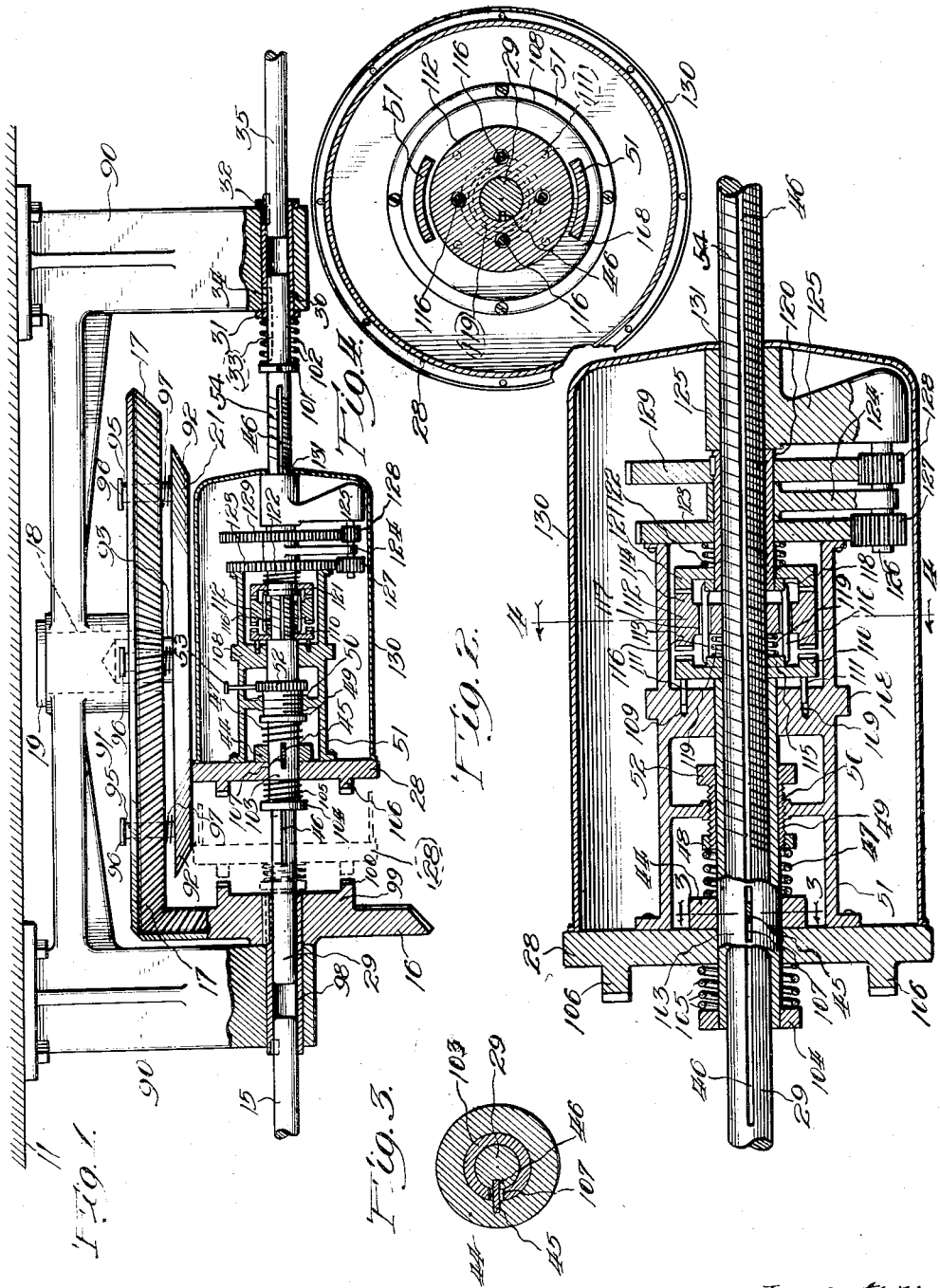

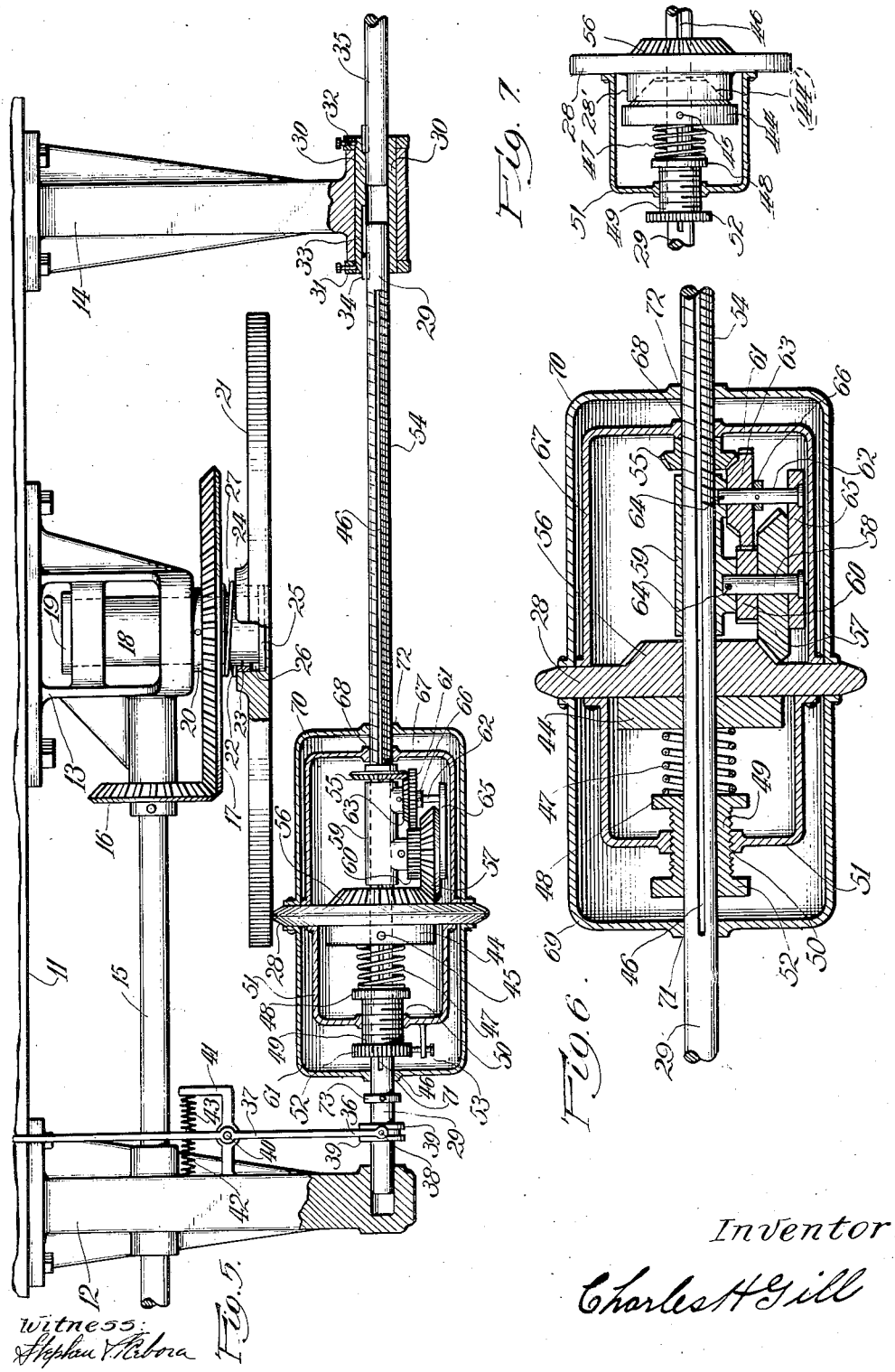

1,458,334

UNITED STATES PATENT OFFICE.

CHARLES H. GILL, OF CHICAGO, ILLINOIS, ASSIGNOR OF ONE FIVE-THOUSANDTH TO LOUIS J. BERGAMO, ONE FIVE-THOUSANDTH TO ANDREW C. ARENTZ, ONE HUNDRED FIVE-THOUSANDTHS TO MACK H. HIGGINBOTTOM, ONE FIVE-THOUSANDTH TO EDWARD DOSSMANN, ONE FIVE-THOUSANDTH TO CAROLINA DOSSMANN, AND ONE FIVE-THOUSANDTH TO HENRY SAXE, ALL OF CHICAGO, ILLINOIS.

SLIPPAGE-GOVERNED TRANSMISSION MECHANISM.

Application filed January 25, 1922, Serial No. 531,643. Renewed December 6, 1922.

*To all whom it may concern:*

Be it known that I, CHARLES H. GILL, a citizen of the United States, residing at Chicago, in the county of Cook and State of Illinois, have invented a new and useful Slippage-Governed Transmission Mechanism, of which the following is a specification.

My invention relates to mechanism adapted to transmit rotary motion from a driving shaft to a driven shaft at differing speed ratios therebetween. This invention is an improvement upon, or further development of, the friction transmission mechanism forming the subject of my copending application for Letters Patent, filed April 17th, 1920, Serial No. 374,683, and reference may be had to that application in connection herewith.

The objects of my invention are, first, to provide a frictional speed ratio changing mechanism normally operatively interposed between the driving shaft and the driven shaft; second, to provide automatic means whereby the speed ratio changing mechanism will be adjusted to vary the ratio of the speed of the driven shaft to the speed of the driving shaft inversely to variations in the resistance offered to the rotation of the driven shaft; third, to provide means adapted to yieldably couple the driven shaft and the driving shaft for rotation in unison with each other; fourth, to provide means for rendering that coupling means operative whenever the ratio of the speed of the driven shaft to the speed of the driving shaft becomes equal or nearly equal; fifth, to provide means adapted to render the frictional speed ratio changing mechanism inoperative for transmission purposes during the time that said coupling means is operative; sixth, to provide automatic means for rendering the frictional speed ratio changing mechanism operative whenever the degree of resistance offered to the rotation of the driven shaft increases beyond the degree offered at the time the said coupling means became operative; and, seventh, to provide means for rendering the said coupling means inoperative whenever the said frictional speed ratio changing mechanism becomes operative.

I attain these objects, and others as will hereinafter appear, preferably by means of the mechanism illustrated in the accompanying drawings, although it will be evident that numerous departures from the exact mechanism described and illustrated are possible without departing from the spirit of my invention. The illustrations and descriptions accompanying this application are merely to specify operative embodiments of my invention, the scope of which is much broader, as particularized in the claims accompanying this specification.

In the drawings—

Figure 1 is a side elevation and partly sectional view of a preferred form of my invention; Figure 2 is an enlarged sectional view of a portion thereof; Figure 3 is a detail section taken on the line 3—3 of Figure 2; Figure 4 is a section taken on the line 4—4 of Figure 2; Figure 5 is a side elevation and partly sectional view of a modified form of my invention; Figure 6 is an enlarged sectional view of a part of the same; and Figure 7 is a fragmentary detail illustrating a modification of the friction coupling parts.

Similar numerals refer to similar parts throughout the several views.

Describing the preferred construction, as illustrated in Figures 1 to 4 inclusive, 11 designates the frame of the automobile or other machine this transmission mechanism is used in connection with and 90 designates a transmission frame suitably secured to the frame 11. A shaft 18 is journaled in a wide bearing part 91 of the frame 90 and has a collar 19 secured upon it above the bearing part 91 and a bevel gear wheel 17 secured upon it below the bearing part 91. A friction disk 21, provided with bevelled edges 92, is fixed upon a short shaft 93 which telescopes within a circular depression in the shaft 18. The friction disk 21 is secured for rotation with the bevel gear wheel 17 by means of pins 95 projecting from the friction disk 21 and spaced around that disk near the periphery thereof. The pins 95 pass through circular openings through the bevel gear wheel 17 and are provided with collars 96 at their upper ends. Spiral springs 97 surround the pins 95 between the friction disk 21 and the bevel gear wheel 17 and tend to push the friction disk 21 away from the bevel gear wheel 17 and into contact with a friction wheel 28, to be described later.

The bevel gear wheel 17 is engaged by a bevel gear wheel 16 mounted upon a sleeve 98 for rotation therewith. The sleeve 98 is journaled in the frame 90 and is keyed to or fixed upon a driving or crank shaft 15. The bevel gear wheel 16 has secured thereto or made integral therewith a clutch member 99 provided with clutch teeth 100.

A shaft 29 is rotatably and slidably mounted in the sleeve 98 and is slidably splined in a sleeve 30 which sleeve 30 is journaled in the frame 90. That is, the sleeve 30 is rotatable in the frame 90 and is prevented from moving longitudinally by collars 31 and 32 fixed thereon. The sleeve 30 is provided with an internally projecting feather 34 which engages in a keyway 33 in the shaft 29. A driven shaft 35 is secured in the sleeve 30 for rotation therewith. A collar 101 is secured upon the shaft 29 and a spiral spring 102 surrounds the shaft 29 and presses against the collar 101 and the collar 31 on the sleeve 30.

A friction wheel 28 is loosely mounted upon a sleeve 103 which loosely surrounds the shaft 29. The friction wheel 28 frictionally engages the friction disk 21 and is adapted to be rotated thereby. The sleeve 103 is provided with a collar 104 and a spiral spring 105 presses its ends against the collar 104 and the friction wheel 28 respectively. The friction wheel 28 is provided with clutch teeth 106 projecting from one of its sides and adapted to engage with the clutch teeth 100 when the friction wheel 28 is moved to position to permit of such engagement.

A collar 44 is loosely mounted upon the sleeve 103 and is provided with an internally projecting feather 45 which passes through a slot 107 in the sleeve 103 and engages in a keyway 46 cut in the shaft 29 longitudinally thereof. A spiral spring 47 surrounds the sleeve 103 and presses the collar 44 into frictional engagement with the flat side of the friction wheel 28, the opposite end of the spring 47 pressing against a collar 48 fixed upon an externally threaded sleeve 49 which passes through an internally threaded opening 50 in a bracket 51 in screw engagement therewith and which is provided with a milled portion 52 for convenience in adjusting the compression of the spring 47. A set screw 53 threaded through the bracket 51 holds the sleeve 49 against accidental turning by engaging the milled portion 52.

The bracket 51, which is secured to the side of the friction wheel 28 by suitable means, is provided with a disk portion 108 having four circular openings 109 drilled in the face thereof and equally spaced apart and from the sleeve 103. The sleeve 103 passes through a circular opening through the disk portion 108 and is adapted to move independently of the said disk portion 108. A clutch member 110 is rotatably and slidably mounted upon the shaft 29 and is adapted to be moved longitudinally thereof and thereon when the sleeve 103, which abuts against it, is moved longitudinally of and upon the shaft 29 in the direction toward the right in the drawings (Figures 1 and 2). The clutch member 110 is provided with four pins 111 projecting from one face thereof and telescoping within the circular openings 109 in the disk portion 108, thus locking the said clutch member for rotation with the disk portion 108 while permitting the clutch member 110 limited longitudinal movement on the shaft 29.

An internally threaded member 112 is mounted upon the shaft 29 in screw engagement with threads 54 cut in the shaft 29 to a lesser depth than the keyway 46. The internally threaded member 112 is provided with clutch teeth 113 upon one face thereof, the teeth 113 being adapted to engage with the clutch member 110, and with clutch teeth 114 upon the opposite face thereof. A collar 115 is loosely mounted upon the shaft 29 and is provided with four rods 116 secured thereto and extending at right angles therefrom through openings 117 through the internally threaded member 112 and secured to another collar 118 on the opposite side of the internally threaded member 112 from the collar 115. A spiral spring 119 surrounds the shaft 29 between the collar 115 and the internally threaded member 112 and tends to normally keep the clutch teeth 113 out of mesh with the clutch member 110. The collar 118 is loosely mounted upon a sleeve 120 upon the shaft 29. A clutch member 121 is splined upon the sleeve 120 and is normally pressed into engagement with the clutch teeth 114 by a spiral spring 122 surrounding the sleeve 120 and pressing one of its ends against the clutch member 121 and the other end against a gear wheel 123 which is rotatably mounted on the sleeve 120 and secured to the bracket 51 for rotation with said bracket and with the friction wheel 28 carrying the said bracket.

A hanger 124 is loosely mounted on the sleeve 120 and a second hanger 125 is loosely mounted on the shaft 29. A shaft 126 is journaled in the hangers 124 and 125 and has fixed thereon pinions 127 and 128. The pinion 127, which is somewhat larger in diameter than the pinion 128, is engaged by the gear wheel 123 and the pinion 128 engages a gear wheel 129, of slightly greater diameter than the gear wheel 123, fixed upon the sleeve 120.

The hangers 124 and 125 are constructed to have considerable weight to counteract any tendency there might otherwise be for them to be carried around in rotation with the gear wheel 123. A casing 130 surrounds the shaft 29 and the parts associated with the friction wheel 28, being secured to the friction wheel 28 for rotation therewith and for longitudinal movement upon the shaft 29 therewith, an opening 131 being provided in said casing for the passage therethrough of the shaft 29.

In operation, the rotary motion of the driving shaft 15 is communicated to the sleeve 98 and to the bevel gear wheel 16 fixed thereon. The bevel gear wheel 16 communicates its rotary motion to the bevel gear wheel 17 which carries with it the friction disk 21. The friction disk 21, pressed into frictional engagement with the friction wheel 28 by the springs 97 on the pins 95, rotates the friction wheel 28 at speed ratios dependent upon the position of the friction wheel 28 with respect to the axis of the friction disk 21.

The collar 44, frictionally engaging the side of the friction wheel 28 with an intensity depending upon the degree of compression of the spring 47 between the collar 44 and the collar 48, as adjusted by means of the threaded sleeve 49 and milled portion 52, tends to rotate with the friction wheel 28. Through the feather 45 which projects inwardly from the collar 44 through the slot 107 in the sleeve 103 and engages with the keyway 46 in the shaft 29, the collar 44 carries with it in rotation the shaft 29. The shaft 29, through the engagement with its keyway 33 of the feather 34 in the sleeve 30, carries the sleeve 30 with it in rotation, and the sleeve 30 carries with it in rotation the shaft 35, which is fixedly secured thereto, and which shaft 35 leads to the mechanism to be operated through this transmission mechanism.

The automatic operation of this transmission mechanism is secured through the rotation of the internally threaded member 112 in engagement with the screw threads 54 on the shaft 29 at speed somewhat less than the speed of the friction wheel 28 but in like direction. This differing speed ratio is secured by reducing gears consisting of the gear wheel 123, rotating in unison with the friction wheel 28, meshing with the pinion 127 which rotates the shaft 126 and, through the pinion 128, gear wheel 129 and sleeve 120, rotates the clutch member 121 in like direction to the friction wheel 28. Through the respective differences in the diameters of the gear wheels 123 and 129 and pinions 127 and 128 the speed of the clutch member 121 is reduced to slightly less than the speed of rotation of the friction wheel 28. The clutch member 121, being pressed into engagement with the clutch teeth 114 of the internally threaded member 112 by the spiral spring 122, is rotated with and by the clutch member 121.

When there is little or no resistance offered to the rotation of the shaft 29 and, consequently, no slippage in the frictional engagement of the collar 44 with the friction wheel 28, the shaft 29 will be rotated at a speed slightly in excess of the speed of the internally threaded member 112 and this will cause the internally threaded member 112 to be moved along the threads in the shaft 29 to the left in Figures 1 and 2, and to carry the friction wheel 28 and all the parts associated therewith, as shown in Figure 2, with it longitudinally of and upon the shaft 29. Thus, the friction wheel 28 is steadily moved further and further from the axis of the friction disk 21 and is, consequently, steadily speeded up as compared to the speed of the friction disk 21. When the friction wheel 28 reaches a distance from the axis of the friction disk 21 so that its speed ratio becomes too great to hold the collar 44 into positive engagement therewith, or when the resistance to the rotation of the shaft 29 increases to an extent sufficient to partially overcome the frictional hold of the collar 44 on the friction wheel 28, the collar 44 will slip somewhat in its frictional engagement and this will reduce the speed of the shaft 29 without reducing the speed of the friction wheel 28, thus tending to more near'y equalize the speeds of the shaft 29 and the internally threaded member 112 and reducing the rate of progress of the internally threaded member toward the left proportionately. When the degree of slippage of the collar 44 becomes sufficient to exactly equalize the speeds of the shaft 29 and the internal'y threaded member 112, there will cease to be any movement of the internally threaded member 112 longitudinally of the shaft 29. Should the resistance to the rotation of the shaft 29 be further increased, so that the degree of slippage of the collar 44 is sufficient to reduce the speed of the shaft 29 below the speed of the internally threaded member 112, then the internally threaded member 112 will spiral to the right on the threads of the shaft 29 and, by drawing the friction wheel 28 closer to the axis of the friction disk 21, will reduce the speed of the friction wheel 28 and tend to reduce the degree of slippage of the collar 44.

To purposely reduce the ratio of the speed of the shaft 29 to the speed of the shaft 15, any braking means may be applied to either the shaft 29 or the shaft 35 or to the mechanism operated thereby to increase the resistance offered to the rotation of the said shafts. If this resistance is sufficient to prevent the rotation of the said shafts entirely, the friction wheel 28 will move to the position where it engages the exact axis of the friction disk 21 where, being in neutral position, it will no longer be rotated by the friction disk 21.

If, with the friction wheel 28 in that position, and with both the shaft 29 and the internally threaded member 112 stopped, the resistance were removed from the shafts 29 and 35, the friction wheel 28 would remain in its central position for lack of anything to move it therefrom. Therefore, the shaft 29 is slidably mounted in the sleeves 98 and 30 and the collar 101 fixed upon the shaft 29 in such position that it will be contacted by the casing 130 slightly before the friction wheel 28 attains that central position and the shaft 29 will be slid to the right, against the resistance of the spiral spring 102, to allow the friction wheel 28 to attain the center of the friction disk 21. In this position, there will be a constant tendency of the spring 102 to force the shaft 29 to the left and to take the friction wheel 28 away from the axis of the friction disk 21, but each small portion of a rotation made by the friction wheel 28, without rotating the shaft 29 through the collar 44, causes the internally threaded member 112 to again carry the shaft 29 to the right. The effect is that the friction wheel 28 will be very slowly rotated all the time that it is in this central position but will not rotate the shaft 29.

This slow rotation of the friction wheel when at center is more desirable than to have it remain stationary as, in the latter case, there would be a tendency to wear off the periphery of the friction wheel at the contacting point. It will be evident that, when the resistance to the rotation of the shaft 29 is removed or reduced so that it can be turned by the collar 44 with the friction wheel 28, movement of the internally threaded member 112 toward the left will commence.

Should the resistance to the rotation of the shaft 29 be so slight as to allow the friction wheel 28 to reach the edge of the flat surface of the friction disk 21 with very slight or no slippage of the collar 44, and should the friction wheel 28 begin to engage with the beveled surface of the friction disk 21, the clutch teeth 106 on the friction wheel 28 will then engage with the clutch teeth 100 of the clutch member 99 and the friction wheel 28 will then be rotated directly with the driving shaft 15. Assuming that there is still little or no slippage of the collar 44 in its engagement with the friction wheel 28, then the shaft 29 will be rotated at the same, or nearly the same, speed as the driving shaft 15, and the internally threaded member 112 will continue to advance to the left and to force the teeth 106 of the friction wheel 28 into complete mesh with the clutch teeth 100 of the clutch member 99.

At about the instant of the first engagement of the tips of the clutch teeth 106 and 100, the collar 104 on the sleeve 103 contacts with the end of the sleeve 98 and further movement to the left of the friction wheel 28 in completing its engagement with the clutch member 99 moves the sleeve 103 to the right relative to the shaft 29 and presses the clutch member 110 into engagement with the clutch teeth 113 of the internally threaded member 112 so that the internally threaded member 112 will be rotated with the friction wheel 28 and there will be no further tendency to move the friction wheel 28 further to the left on the shaft 29.

Movement of the clutch member 110 into engagement with the clutch teeth 113 of the internally threaded member 112 presses the loose collar 115, against the resistance of the spring 119, to the right and moves the rods 116 through the openings through the internally threaded member 112 and the loose collar 118 so that the clutch member 121 is pressed out of engagement with the clutch teeth 114, against the resistance of the spiral spring 122, at the same time that the clutch member 110 is pressed into engagement with the clutch teeth 113 on the internally threaded member 112.

Since, with the clutch teeth 106 of the friction wheel 28 in full engagement with the clutch teeth 100 of the clutch member 99, and with the internally threaded member 112 rotating with the friction wheel 28, the slightest degree of slippage in the frictional engagement of the collar 44 with the friction wheel 28 will effect movement to the right of the internally threaded member 112, it will be seen that this direct drive at high gear ratio will be maintained only while there is no slippage whatever, or so little as to not disengage the clutch teeth 100 and 106. When the slippage is such, however, as to disengage those teeth, it will permit the sleeve 103 to be moved back to its normal position by the spiral spring 105 and will disengage the clutch member 110 from and engage the clutch member 121 with the internally threaded member 112. When the friction wheel 28 is moved to position where the clutch teeth 100 and 106 fully engage it has moved out of contact with the beveled surface of the friction disk 21 and that friction disk and the bevel gear wheel 17 turn idly during the period of direct drive. As the friction wheel 28 moves to the right again, it engages frictionally the beveled edge of the friction disk 21 and, as the friction wheel 28 is drawn further to the right by the internally threaded member 112, the friction disk 21 is cammed up against the resistance of the springs 97 by the action of the friction wheel 28 against the beveled edge 92 until the periphery of the friction wheel 28 engages the flat surface of the friction disk 21.

It should be noted that the pinions 127 and 128 are prevented from rotating with the gear wheel 123, as would be their tendency to do, through the weight of the hangers 124 and 125 and the shaft 126, and these may be of whatever weight may be needed to effect the purpose. It is evident that the same result could be achieved by mounting the pinions slidably on a separate shaft running parallel to the shaft 29, but I have preferred to show a construction wherein only the one shaft is employed in line.

A modified form of this invention is illustrated in Figures 5 and 6, differing from the preferred form only in details of arrangement of parts and in providing no direct driving means and in showing a combined reversing means and means for moving the friction wheel 28 from contact with the axis of the friction disk 21 for normal movement. Also, a differing method of effecting pressure of the friction disk 21 against the friction wheel 28 is illustrated.

It should be noted that, neither in this modified form nor in the preferred construction, does the friction wheel 28 ever slip in its engagement with the friction disk 21. The tension of the spiral spring 47, pressing the collar 44 into frictional engagement with the friction wheel 28, is adjusted in such manner that it will always be slightly easier for the collar 44 to slip in its frictional engagement than for the friction wheel 28 to slip against the friction disk 21.

Referring to Figures 5 and 6, journaling hangers 12, 13 and 14 are secured to the frame 11 of the vehicle or machine and a driving shaft 15 is journaled in hangers 12 and 13. A bevel gear wheel 16 fixed upon the shaft 15 engages a bevel gear wheel 17 fixedly mounted upon a short shaft 18 journaled in the hanger 13 and fixed against longitudinal movement by means of a collar 19 on said shaft 18 and a hub 20 on the bevel gear wheel 17. A friction disk 21 is slidably mounted upon the shaft 18 but is secured for rotation with said shaft by means of a keyway 23 in the shaft 18 and an engaging feather 22 projecting inwardly from a collar 24 secured to the friction disk 21. The shaft 18 has a disk 25 of somewhat greater diameter than said shaft secured upon its lower end and this disk 25 fits into a circular depression 26 in the friction disk 21 and is adapted to permit sliding movement of the disk 21 upon the shaft 18 within the limits of the depth of the depression 26. A spiral spring 27 surrounds the shaft 18, pressing against the collar 24 and the bevel gear wheel 17 and serves to press the friction disk 21 into frictional engagement with a friction wheel 28.

The friction wheel 28 is mounted for free rotation upon a shaft 29 which is rotatably and slidably journaled in the hanger 12 and slidably mounted in a sleeve 30 which is rotatably mounted in the hanger 14. The sleeve 30 is secured against longitudinal movement by collars 31 and 32 thereon. The sleeve 30 is provided with an internal keyway 33 in which slides a feather 34 on the shaft 29, coupling the sleeve 30 and shaft 29 together rotatably. A shaft 35 is fixed in the sleeve 30 and leads to the mechanism to be driven through this transmission mechanism.

The shaft 29 is normally held against longitudinal sliding movement by means of a bifurcated end 36 of a lever 37 fitted with pins 38 riding in an annular recess formed by two collars 39 secured upon the shaft 29. The lever 37 is pivoted by a pin 40 upon an extension bracket 41 secured to the hanger 12 and spiral springs 42 and 43, secured to the lever 37 and respectively to the hanger 12 and the bracket 41 normally maintain the lever 37 in the position indicated in the drawings.

A collar 44 is mounted upon the shaft 29 and is provided with an internally projecting pin or feather 45 which engages with a keyway 46 cut deeply in the shaft 29 and running longitudinally thereof. A spiral spring 47 surrounds the shaft 29 and is compressed between the collar 44 and a collar 48 fixed upon an externally threaded sleeve 49 which is in screw engagement with internal threads in an opening 50 through a frame 51 which is secured to the friction wheel 28. A milled collar 52 on the sleeve 49 is convenient in adjusting the compression of the spring 47 and a set screw 53, passing through the frame 51 and engaging the milled collar 52, prevents accidental changes in the adjustment of the compression of the spring 47.

Screw threads 54 are provided upon a portion of the shaft 29, extending almost to the sleeve 30 to the right in the drawings and to a point most clearly shown in Figure 6 to the left. These screw threads 54 are engaged by internal threads in a bevel pinion 55 upon the shaft 29.

A bevel gear wheel 56 is secured to the friction wheel 28 for rotation therewith and the bevel gear wheel 56 engages a bevel gear wheel 57 mounted for free rotation upon a stub shaft 58 which is fixed in a sleeve 59 surrounding the shaft 29. A gear wheel 60 is secured to the bevel gear wheel 57 and engages a gear wheel 61 of slightly larger diameter and mounted for free rotation upon a stub shaft 62 fixed in the sleeve 59. A bevel pinion 63 is secured to the gear wheel 61 for rotation therewith and engages the internally threaded bevel pinion 55.

The stub shafts 58 and 62 are secured in recesses in the sleeve 59 by means of pins 64 and are secured to a weight plate 65 at their outer ends. A collar 66 on the stub shaft 62 retains the gear wheel 61 in position on that shaft. The sleeve 59 serves to retain the bevel pinion 55 at a given distance from the friction wheel 28 and a frame 67, secured to the friction wheel 28 and provided with an opening 68 for the passage therethrough of the shaft 29, cooperates to retain the parts in fixed spaced relationship to each other. Two shells or casings 69 and 70 are secured to the friction wheel 28 on opposite sides thereof to enclose all but the outer portion of the friction wheel 28 and all of the parts just described as associated therewith. The shells or casings 69 and 70 are provided with openings 71 and 72 for the passage therethrough of the shaft 29.

A collar 73 is secured upon the shaft 29 at a point to be abutted against by the casing 69 when the friction wheel 28 reaches a point near the periphery of the friction disk 21. The threads 54 upon the shaft 29 terminate at a point (see Figure 6) so that the internally threaded bevel pinion 55 will clear the threads 54 slightly before the casing 69 contacts with the collar 73.

In operation, this modified form transmits the rotary motion of the driving shaft 15 to the friction disk 21 through the bevel gear wheels 16 and 17 and shaft 18 and the friction disk 21 rotates the friction wheel 28 at speed ratios varying with the distance from the axis of the friction disk 21 of the engagement between the said friction disk and said friction wheel. Through its frictional engagement with the side of the friction wheel 28, the collar 44 tends to be rotated therewith and to rotate the shaft 29 through the pin or feather 45 engaging in the keyway 46. Rotary motion in like direction but at somewhat lesser speed is transmitted to the bevel pinion 55 from the friction wheel 28 through the gears 56, 57, 60, 61 and 63 and, therefore, so long as there is little or no slippage between the collar 44 and the friction wheel 28, the slower rotation of the bevel pinion 55, in screw engagement with the shaft 29, than the rate of rotation of the shaft 29 causes the bevel pinion 55 to move to the left on the shaft 29 and to carry with it all the members embraced within the casings 69 and 70, thus increasing the speed ratio of the friction wheel 28 and of the shaft 29. When the resistance to the shaft 29 rotating becomes sufficient to cause slippage of the collar 44 against the friction wheel 28, or when the speed ratio becomes so high as to induce such slippage, the consequent slowing of the shaft 29 will tend to equalize the speeds of the bevel pinion 55 and the shaft 29 and will either halt or slow down the movement of the bevel pinion 55 to the left on the shaft 29. If the degree of slippage of the collar 44 becomes sufficient to slow the shaft 29 below the rotary speed of the bevel pinion 55, there will ensue movement of the bevel pinion 55 to the right along the shaft 29.

Should sufficient resistance to the rotation of the shaft 29 be applied to totally stop its rotation, the bevel pinion 55 will move to the right along the shaft 29 until the friction wheel 28 engages the friction disk 21 at the axis of said disk, when there will be no further rotary motion of the friction wheel 28, shaft 29 or bevel pinion 55 and this position will, therefore, be maintained until something is done to move the friction wheel 28 away from the axis of the friction disk 21.

When it is desired to again drive the shaft 29 in the same direction as assumed in the previous description, the lever 37 is moved so as to slide the shaft 29 to the left, the method of accomplishing this being obvious from the drawings and previous description of construction. Such movement to the left of the shaft 29 carries with it the bevel pinion 55, because of its screw engagement with the threads 54, and the friction wheel 28, taking the latter to the left of the axis of the friction disk 21 and restarting the operation. Movement of the lever 37 in the opposite direction to that just described will slide the shaft 29 to the right and will move the friction wheel 28 to the right of the axis of the friction disk 21, causing the friction wheel 28 to be rotated in the reverse direction to that previously described. Since this will also cause reverse motion of all the parts on the shaft 29, and of that shaft, the operation will be precisely as described previously where the friction wheel 28 was at the left of the axis of the friction disk 21.

It is not desirable that the lever 37 should be held in any position other than its normal position. It need only be moved to the right or left, according to which direction it is desired to start the shaft 29 rotating in, and to immediately release the lever 37 to regain its normal position under the influence of the springs 42 and 43.

It is obvious that the reversing means employed in this modified form might also be used in connection with the preferred form previously described with very little adaptation if desired.

Figure 7 illustrates a modification of the means for frictionally engaging the collar 44 with the friction wheel 28, consisting in the employement of a conical member 44' secured to or made integral with the collar 44 and adapted to frictionally engage in a conical depression in a hub 28' of the friction wheel 28 under pressure of the spiral spring 47. Obviously, this form of friction coupling might be used in place of the form illustrated and described in either the preferred or modified constructions above, having the advantage of giving greater frictional engaging surface without using greater space radially.

I claim:

1. In transmission mechanism, the combination of a driving shaft, a driven shaft, speed changing mechanism operatively interposed between said shafts and including a member mounted for free rotation upon said driven shaft, an element mounted upon said driven shaft to rotate said driven shaft therewith and yieldably engaging said member, and automatic means carried entirely by said driven shaft and controlled by the degree of yield in the engagement of said element with said member, above or below a given degree of yield, for so changing the relationship of the said member to the balance of the said speed changing mechanism as to vary the ratio of the rotary speed of the said driven shaft to the speed of the said driving shaft inversely to variations in the degree of resistance offered to the rotation of the said driven shaft.

2. In transmission mechanism, the combination of a driving shaft, a driven shaft, speed changing mechanism operatively interposed between said shafts and including a member mounted for free rotation upon said driven shaft, an element mounted upon said driven shaft to rotate said driven shaft therewith and frictionally engaging said member, and automatic means carried entirely by said driven shaft and controlled by the degree of slippage in the engagement of said element with said member, above or below a given degree of slippage, for so changing the relationship of the said member to the balance of the said speed changing mechanism as to vary the ratio of the rotary speed of the said driven shaft to the speed of the said driving shaft inversely to variations in the degree of resistance offered to the rotation of the said driven shaft.

3. In transmission mechanism, the combination of a driving shaft, a driven shaft, speed changing mechanism operatively interposed between said shafts and including a member mounted for free rotation upon said driven shaft, an element mounted upon said driven shaft to rotate said driven shaft therewith and yieldably engaging said member, and automatic means carried entirely by said driven shaft and controlled by the degree of yield in the engagement of said element with said member under varying degrees of resistance offered to the rotation of the said driven shaft, above or below a given degree of yield, for so changing the relationship of the said member to the balance of the said speed changing mechanism as to vary the ratio of the rotary speed of the said driven shaft to the speed of the said driving shaft inversely to variations in the degree of resistance offered to the rotation of the said driven shaft.

4. In transmission mechanism, the combination of a driving shaft, a driven shaft, speed changing mechanism operatively interposed between said shafts and including a member mounted for free rotation upon said driven shaft, an element mounted upon said driven shaft to rotate said driven shaft therewith and frictionally engaging said member, and automatic means carried entirely by said driven shaft and controlled by the degree of slippage in the engagement of said element with said member under varying degrees of resistance offered to the rotation of the said driven shaft, above or below a given degree of slippage, for so changing the relationship of the said member to the balance of the said speed changing mechanism as to vary the ratio of the rotary speed of the said driven shaft to the rotary speed of the said driving shaft inversely to variations in the degree of resistance offered to the rotation of the said driven shaft.

5. In transmission mechanism, the combination of a driving shaft, a driven shaft, speed changing mechanism operatively interposed between said shafts and including a member mounted for free rotation upon said driven shaft, an element mounted upon said driven shaft to rotate said driven shaft therewith and yieldably engaging said member, automatic means carried entirely by said driven shaft and controlled by the degree of yield in the engagement of said element with said member under varying degrees of resistance offered to the rotation of the said driven shaft, above or below a given degree of yield, for so changing the relationship of said member to the balance of the said speed changing mechanism as to vary the ratio of the rotary speed of the said driven shaft to the rotary speed of the said driving shaft inversely to variations in the degree of resistance offered to the rotation of the said driven shaft, and means for adjusting the intensity of the engagement between the said element and the said member.

6. In transmission mechanism, the combination of a driving friction disk, a driven shaft, a friction wheel engaging the said friction disk and rotatably and slidably mounted upon said driven shaft to be movable radially of and in engagement with said friction disk, a member splined upon said driven shaft and pressed into frictional engagement with said friction wheel, and automatic means carried entirely by said driven shaft and controlled by the degree of effectiveness of the frictional engagement between the said member and the said friction wheel under varying degrees of resistance offered to the rotation of the said driven shaft for so varying the position of the said friction wheel with respect to the axis of the said friction disk as to vary the ratio of the rotary speed of the said driven shaft to the rotary speed of the said friction disk inversely to variations in the degree of resistance offered to the rotation of the said driven shaft.

7. In transmission mechanism, the combination of a driving rotatable friction member, a driven shaft, a friction wheel engaging the said friction member and rotatably and slidably mounted upon said driven shaft to be movable with respect to the axis of said friction member while remaining in engagement therewith, an element splined upon said driven shaft and pressed into frictional engagement with said friction wheel, and automatic means consisting of mechanism carried by said friction wheel and by said driven shaft and controlled by the degree of effectiveness of the frictional engagement between the said element and the said friction wheel under varying degrees of resistance offered to the rotation of the said driven shaft for so varying the position of the said friction wheel with respect to the axis of the said friction member as to vary the ratio of the rotary speed of the said driven shaft to the rotary speed of the said friction member inversely to variations in the degree of resistance offered to the rotation of the said driven shaft.

8. In transmission mechanism, the combination of a driving rotatable friction member, a driven shaft, a friction wheel engaging the said friction member and rotatably and slidably mounted upon said driven shaft to be movable with respect to the axis of the said friction member while remaining in engagement therewith, an element splined upon said driven shaft, means adapted to press said element into frictional engagement with said friction wheel, means adapted to adjust the last named means as to the intensity of the pressure of said element against said friction wheel, and automatic means consisting of mechanism carried by said friction wheel and by said driven shaft and controlled by the degree of effectiveness of the frictional engagement between the said element and the said friction wheel under varying degrees of resistance offered to the rotation of the said driven shaft for so varying the position of the said friction wheel with respect to the axis of the said friction member as to vary the ratio of the rotary speed of the said driven shaft to the speed of the said friction member inversely to variations in the degree of resistance offered to the rotation of the said driven shaft.

9. In transmission mechanism, the combination of a shaft, a rotatable driving member mounted for free rotation upon said shaft and for movement longitudinally of and upon said shaft, a rotatable driven member mounted upon said shaft for rotation therewith and movement longitudinally thereof and thereon and frictionally engaging the said driving member, and automatic means carried entirely by said shaft and controlled by the degree of slippage in the frictional engagement between said members for moving the said members longitudinally of and upon said shaft.

10. In transmission mechanism, the combination of a shaft, a driving member and a driven member mounted upon said shaft and movable longitudinally thereof and thereon and frictionally engaging each other, and means carried entirely by said shaft and controlled by the degree of effectiveness of the frictional engagement between the said members for moving the said members upon the said shaft and longitudinally thereof.

11. In transmission mechanism, the combination of a driving shaft, a member rotatable by said driving shaft, a friction disk concentric with said member, openings through said member, pins projecting from said friction disk and spaced around the said friction disk near the periphery thereof, said pins passing through said openings through the said member, a friction wheel, a driven shaft mounting said friction wheel, spiral springs surrounding the said pins between the said friction disk and the said member and adapted to press the said friction disk against the periphery of the said friction wheel, and automatic means controlled by variations in the degree of resistance offered to the rotation of the said driven shaft for varying the position of the said friction wheel relative to the axis of the said friction disk.

12. In transmission mechanism, the combination of a driving shaft, a second shaft, a friction member rotatable upon said second shaft by said driving shaft and composed of two circular parts, the first of said parts being fixed against longitudinal movement upon said second shaft and the second of said parts being movable in directions longitudinally of said second shaft but rotatable with and by said first part, the said second part being urged away from said first part by springs spaced around and between the said parts near the peripheries thereof, a friction wheel engaging the said second part of the said friction member and rotatable thereby, and automatic means controlled by variations in the resistance to the rotation of said friction wheel and adapted to move the said friction wheel radially of the said friction member.

13. In transmission mechanism, the combination of a driving friction disk, a shaft, a friction wheel mounted upon said shaft normally engaging said driving friction disk and movable radially of said driving friction disk to beyond the radius of said driving friction disk, the said driving friction disk having a beveled peripheral portion adapted to facilitate the movement of the said friction wheel into or out of engagement with said driving friction disk, and automatic means controlled by variations in the degree of resistance offered to the rotation of said shaft and adapted to move the said friction wheel radially of said driving friction disk to varying distances from the axis of said driving friction disk.

14. In transmission mechanism, the combination of a shaft, a driven wheel rotatably mounted upon said shaft, a driving member engaging with and driving said driven wheel, a member mounted upon and secured for rotation with said shaft and in yieldable engagement with said driven wheel, threads upon said shaft, an internally threaded element mounted upon said shaft in screw engagement with said threads, and gearing adapted to transmit rotary motion from said driven wheel to said internally threaded element in like direction to and at speed differing from the said driven wheel.

15. In transmission mechanism, the combination of a shaft, a driven wheel rotatably mounted upon said shaft, a driving member engaging with and driving said driven wheel, a member mounted upon and secured for rotation with said shaft and in yieldable engagement with said driven wheel, threads upon said shaft, an internally threaded element mounted upon said shaft in screw engagement with said threads, gearing adapted to normally transmit rotary motion from said driven wheel to said internally threaded element in like direction to and at speed differing from the said driven wheel, means for rendering said gearing inoperative, and means for transmitting rotary motion from said driven wheel to said internally threaded element in like direction and like speed to the said driven wheel when said gearing is rendered inoperative.

16. In transmission mechanism, the combination of a friction driving disk, a friction wheel rotatable by and movable radially of the said friction driving disk in engagement therewith, a driven shaft mounting the said friction wheel for free rotation thereon and for longitudinal movement thereon and thereof, a member splined upon said driven shaft and yieldably engaging the said friction wheel in such manner as to normally yield to a given degree in such engagement during each rotation of the said friction wheel, and means carried entirely by said driven shaft and controlled by the degrees of yield of said member in said engagement above or below the said given degree of yield for automatically so moving the said friction wheel radially of the said friction driving disk as to vary the ratio of the rotary speed of the said driven shaft to the rotary speed of the said friction driving disk inversely to variations in the degree of resistance offered to the rotation of the said driven shaft.

17. In transmission mechanism, the combination of a driving member, a driven shaft, speed changing mechanism operatively interposed between the said driving member and the said driven shaft for transmitting the rotary motion of the said driving member to the said driven shaft in varying speed ratios and including two members mounted upon the same shaft and in frictional engagement with each other, and automatic means carried entirely by said driven shaft and controlled by the degree of slippage in the frictional engagement of the said two members, above or below a given normal degree of slippage, for so adjusting the said speed changing mechanism as to vary the ratio of the rotary speed of the said driven shaft to the rotary speed of the said driving member inversely to variations in the degree of resistance offered to the rotation of the said driven shaft.

18. In transmission mechanism, the combination of a driving friction member, a driven shaft, screw threads on said driven shaft, a keyway in said shaft longitudinally thereof and cut to greater depth than said screw threads, a friction wheel mounted upon said driven shaft for free rotation and longitudinal movement thereon and driven by said driving friction member, an element mounted upon said driven shaft for free longitudinal movement thereon and yieldably engaging the said friction wheel, a feather carried by said element and engaging said keyway to cause said driven shaft to be rotated with said element, an internally threaded member mounted upon said driven shaft in screw engagement with said screw threads thereon, means for rotating the said internally threaded member, means controlled by the degree of yield in the engagement between the said friction wheel and the said element for varying the ratio of the rotary speed of the said internally threaded member to the speed of the said driven shaft, and means controlled by the said ratio for varying the ratio of the rotary speed of the said driven shaft to the speed of the said driving friction member inversely to variations in the degree of resistance offered to the rotation of the said driven shaft.

19. In transmission mechanism, the combination of a friction driving member, a rotatable and slidable intermediate shaft, means for normally securing the said intermediate shaft against longitudinal sliding movement, a friction wheel mounted upon said intermediate shaft for free rotation and longitudinal sliding movement thereon and driven by said friction driving member, a driven shaft coupled to the said intermediate shaft for rotation therewith but not for sliding movement therewith, means for yieldably engaging the said friction wheel with the said intermediate shaft to rotate said intermediate shaft therewith, and means for moving the said intermediate shaft longitudinally.

20. In transmission mechanism, the combination of a driving shaft, a driven shaft, automatic speed ratio changing mechanism adapted to be operatively interposed between said shafts, yieldable coupling means adapted to couple said shafts and to transmit rotary motion from said driving shaft to said driven shaft independently of said speed ratio changing mechanism, means for rendering said yieldable coupling means inoperative while said speed ratio changing mechanism is operative for transmission purposes, means for rendering said speed ratio changing mechanism inoperative for transmission purposes while said yieldable coupling means is operative, and automatic means controlled by the degree of resistance offered to the rotation of the said driven shaft for determining whether the rotary motion of the said driving shaft is transmitted to the said driven shaft through the said speed ratio changing mechanism or through the said yieldable coupling means independently of the said speed ratio changing mechanism.

21. In transmission mechanism, the combination of a driving shaft, a driven shaft, coupling means adapted to couple the said shafts for rotation together or to uncouple the said shafts, friction transmission mechanism adapted to become operative to transmit rotary motion from said driving shaft to said driven shaft when said shafts are uncoupled and to become inoperative when said shafts are coupled together, and automatic means controlled by the degree of resistance offered to the rotation of said driven shaft for actuating the said coupling means.

22. In transmission mechanism, the combination of a driving shaft, a clutch-toothed member carried by said driving shaft, a driven shaft, a second clutch-toothed member yieldably carried by the said driven shaft and adapted to engage with the clutch-toothed member carried by the said driving shaft to lock the said shafts for rotation together, said second clutch-toothed member being movable longitudinally of and upon the said driven shaft, and means controlled by the yield of the said second clutch-toothed member under degrees of resistance to the rotation of the said driven shaft in excess of a given degree for moving the said second clutch-toothed member longitudinally of and upon the said driven shaft out of contact with the said first named clutch-toothed member and for moving the said second clutch-toothed member longitudinally of and upon the said driven shaft into engagement with the said first named clutch-toothed member when the degrees of resistance offered to the rotation of the said driven shaft do not exceed the said given degree.

23. In transmission mechanism, the combination of a driving shaft, a driven shaft, a friction driving member rotatable by said driving shaft, a friction driven member engaging with said friction driving member and movable to varying distances from the axis of said friction driving member while maintaining frictional engagement therewith and to a further distance from the axis of the said friction driving member without engagement therewith, said friction driven member being mounted upon said driven shaft for movement longitudinally thereof and thereon and yieldably engaging said driven shaft to rotate said driven shaft therewith, and means operative while less than a given degree of yield occurs in the engagement of said friction driven member with said driven shaft for moving the said friction driven member away from the axis of the said friction driving member longitudinally of and upon the said driven shaft to a distance from said axis where the said friction driven member is out of frictional engagement with said friction driving member and operative when more than the said given degree of yield occurs in the engagement of the said friction driven member with the said driven shaft for moving the said friction driven member toward the axis of said friction driving member and into engagement with said friction driving member.

24. In transmission mechanism, the combination of a driving shaft, a driven shaft concentric with said driving shaft, a friction driving member rotated by said driving shaft, a friction wheel mounted upon said driven shaft to move longitudinally thereof and thereon and frictionally driven by said friction driving member, a clutch-toothed member carried by said driving shaft, clutch-teeth carried by said friction wheel, and automatic means controlled by the degree of resistance offered to the rotation of the said driven shaft and adapted to move the said friction wheel longitudinally of and upon the said driven shaft to varying distances from the axis of the said friction driving member and to engage the said clutch-teeth carried by the said friction wheel with the clutch-toothed member carried by said driving shaft when the said friction wheel is at its greatest distance from the axis of the said friction driving member.

25. In transmission mechanism, the combination of a driving shaft, a friction driving disk rotated by said driving shaft and having a beveled periphery, a driven shaft concentric with said driving shaft, a friction wheel mounted upon said driven shaft to be freely rotatable and movable longitudinally thereon, resilient means pressing the said friction driving disk into frictional engagement with said friction wheel, an element splined upon the said driven shaft and pressed into frictional engagement with the said friction wheel, said engagement being less effective than the frictional engagement between the said friction wheel and the said friction driving disk, threads carried by said driven shaft, an internally threaded member mounted upon said driven shaft in screw engagement with said threads, gearing suspended from and mounted upon said driven shaft and normally adapted to transmit rotary motion from said friction wheel to said internally threaded member in like direction to and at differing speed from said friction wheel, clutch-teeth carried by said friction wheel, a clutch-toothed member carried by said driving shaft and adapted to be engaged by the said clutch-teeth carried by the said friction wheel when the said friction wheel is moved longitudinally of and upon the said driven shaft to a distance from the axis of the said friction driving disk sufficient to take the said friction wheel out of engagement with said friction driving disk, and means adapted to render inoperative the said gearing for transmitting rotary motion from the said friction wheel to the said internally threaded member and to cause the said internally threaded member to be rotated by the said friction wheel in like direction and at like speed to said friction wheel, said last named means becoming operative only when said friction wheel is moved out of engagement with said friction driving disk and becoming inoperative when said friction wheel is moved into engagement with said friction driving disk.

26. In transmission mechanism, the combination of a threaded driven shaft, a driven wheel rotatable on said shaft, an internally threaded member rotatably mounted upon said shaft in screw engagement with the threads on said shaft, and means carried entirely by said shaft and adapted to transmit rotary motion from said driven wheel to said internally threaded member in like direction to but at differing speed from said driven wheel.

27. In transmission mechanism, the combination of a threaded driven shaft, a driven wheel rotatable on said shaft, an internally threaded member rotatably mounted upon said shaft in screw engagement with the threads on said shaft, means adapted to transmit rotary motion from said driven wheel to said internally threaded member in like direction and at like speed to said driven wheel, means adapted to transmit rotary motion from said driven wheel to said internally threaded member in like direction to but at speed differing from the said driven wheel, and automatic means adapted to select and render operative the first named means adapted to transmit rotary motion and to render inoperative the second named means adapted to transmit rotary motion under given conditions and to select and render operative the second named means adapted to transmit rotary motion and to render inoperative the first named means adapted to transmit rotary motion under other given conditions.

28. In transmission mechanism, the combination of a rotatable threaded shaft, a driven wheel mounted upon said shaft for free rotation thereon and movement longitudinally thereof and thereon, an element splined upon said shaft and yieldably engaging the said driven wheel, an internally threaded member rotatably mounted upon said shaft in screw engagement with the threads on said shaft, and means for rotating the said internally threaded member in like direction and at fixed speed ratio to the said driven wheel.

29. In transmission mechanism, the combination of a rotatable threaded shaft, a driven wheel mounted upon said shaft for free rotation thereon and for movement longitudinally thereof and thereon, an element splined upon said shaft and yieldably engaging the said driven wheel, an internally threaded member rotatably mounted upon said shaft in screw engagement with the threads on said shaft, and means for rotating the said internally threaded member in like direction to the said driven wheel and at either of two fixed speed ratios to the said driven wheel.

30. In transmission mechanism, the combination of a rotatable threaded shaft, a driven wheel mounted upon said shaft for free rotation thereon and for movement longitudinally thereof and thereon, an element splined upon said shaft and yieldably engaging the said driven wheel, an internally threaded member rotatably mounted upon said shaft in screw engagement with the threads on said shaft, means for rotating the said internally threaded member in like direction to the said driven wheel and at either of two fixed speed ratios to the said driven wheel, and automatic means controlled by the movement of said driven wheel longitudinally of and upon the said shaft for selecting either one of the said two speed ratios.

31. In transmission mechanism, the combination of a driving shaft, a driven shaft, speed changing mechanism adapted to transmit rotary motion from said driving shaft to said driven shaft at varying ratios of speed therebetween, clutch means adapted to couple the said driving shaft and said driven shaft for rotation together independently of said speed changing mechanism, and automatic means controlled by the degree of resistance offered to the rotation of the said driven shaft for either rendering the said clutch means operative and the said speed changing mechanism inoperative or for rendering the said clutch means inoperative and adjusting the said speed changing mechanism to vary the ratio of the rotary speed of the said driven shaft to the rotary speed of the said driving shaft inversely to variations in the resistance offered to the rotation of the said driven shaft.

32. In transmission mechanism, the combination of a driving shaft, a driven shaft, coupling means normally coupling the said shafts for rotation together, automatic means becoming operative whenever the resistance to the rotation of the said driven shaft exceeds a given degree and adapted to uncouple the said shafts, and speed ratio changing mechanism adapted to transmit rotary motion from said driving shaft to said driven shaft and to become operative whenever said shafts are uncoupled and to be automatically adjusted by the said automatic means to vary the ratio of the speed of the said driven shaft to the speed of the said driving shaft inversely to variations in the resistance offered to the rotation of the said driven shaft.

33. In transmission mechanism, the combination of a driving shaft, a driven shaft, coupling means adapted to couple the said shafts for rotation together, automatic means controlled by the resistance offered to the rotation of the said driven shaft and adapted to render the said coupling means operative while the said resistance does not exceed a given degree and to render the said coupling means inoperative whenever and while the said resistance exceeds the said given degree, and speed ratio changing mechanism becoming operative whenever and while the said coupling means is inoperative and adapted to be automatically adjusted by the said automatic means to vary the ratio of the speed of the said driven shaft to the speed of the said driving shaft inversely to variations in the resistance offered to the rotation of the said driven shaft.

34. In transmission mechanism, the combination of a driving shaft, a clutch member carried by said driving shaft, a threaded driven shaft, a rotatable member mounted upon the said driven shaft for free rotation thereon and for longitudinal movement thereof and thereon, clutch teeth carried by said rotatable member and adapted to engage with the said clutch member when the said rotatable member occupies a position longitudinally of the said driven shaft permitting such engagement, an element splined upon the said driven shaft and yieldably engaging the said rotatable member, an internally threaded member rotatably mounted upon said driven shaft in screw engagement with the threads on said shaft, means for rotating the said internally threaded member in like direction to the said rotatable member and at either of two fixed speed ratios to the said rotatable member, and automatic means adapted to select one of said fixed speed ratios whenever the said clutch member and the said clutch teeth of the said rotatable member are engaged and to select the other of said fixed speed ratios whenever the said clutch member and the said clutch teeth of the said rotatable member are disengaged.

35. In transmission mechanism, the combination of a driving shaft, a driven shaft, speed changing mechanism interposed between said shafts and automatically controlled by changes in the resistance offered to the rotation of the said driven shaft to transmit rotary motion from said driving shaft to said driven shaft at speed ratios therebetween varying with variations in the degrees of resistance offered to the rotation of the said driven shaft, clutching means adapted to couple the said shafts together, and automatic means for rendering the said clutching means operative and the said speed changing mechanism inoperative whenever and while the degree of resistance offered to the rotation of the said driven shaft is below a given degree and for rendering the said clutching means inoperative and the said speed changing mechanism operative whenever and while the degrees of resistance offered to the rotation of the said driven shaft exceed the said given degree.

36. In transmission mechanism, the combination of a rotatably and slidably mounted shaft, a rotatable member mounted upon said shaft for free rotation thereon and for longitudinal movement thereof and thereon, means for yieldably coupling said shaft to said rotatable member for rotation with said rotatable member, automatic means controlled by the resistance offered to the rotation of the said driven shaft for moving the said rotatable member longitudinally of and upon the said shaft, a stop upon the said shaft adapted to limit the movement of the said rotatable member in one direction longitudinally of and upon the said shaft in such manner that further movement of said rotatable member in said direction must carry the said shaft therewith, and resilient means adapted to resist the sliding movement of the said shaft in the said direction.

CHARLES H. GILL.